(12) United States Patent
Wang et al.

(10) Patent No.: US 12,219,929 B1
(45) Date of Patent: Feb. 11, 2025

(54) ROLLABLE BALL TOY

(71) Applicant: PET GRAVITY (HANGZHOU) TECHNOLOGY CO., LTD, Hangzhou (CN)

(72) Inventors: Lijun Wang, Hangzhou (CN); Xianfu Cao, Hangzhou (CN)

(73) Assignee: PET GRAVITY (HANGZHOU) TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/918,475

(22) Filed: Oct. 17, 2024

Related U.S. Application Data (63) Continuation of application No. PCT/CN2024/093006, filed on May 29, 2024.

(30) Foreign Application Priority Data

May 9, 2024 (CN) .......................... 202420986972.1

(51) Int. Cl.
  *A01K 15/02* (2006.01)
(52) U.S. Cl.
  CPC .................................. *A01K 15/025* (2013.01)
(58) Field of Classification Search
  CPC .... A01K 15/025; A01K 15/026; A01K 15/02; A01K 15/027; A63H 33/005; A63H 15/06; A63H 33/007; A63H 7/02; B25J 9/0003; B25J 11/00; B25J 9/126; B62D 57/00; B62D 61/00
  USPC .......................... 446/450, 266; 119/707, 702
  See application file for complete search history.

(56) References Cited

U.S. PATENT DOCUMENTS

| | | | | |
|---|---|---|---|---|
| 5,934,968 | A | 8/1999 | Lin | |
| 2016/0316721 | A1* | 11/2016 | Xie | ......................... G03B 29/00 |
| 2019/0216049 | A1* | 7/2019 | Yuan | ........................ A01K 5/02 |

FOREIGN PATENT DOCUMENTS

| | | | | | |
|---|---|---|---|---|---|
| CN | 104782523 | A | | 7/2015 | |
| CN | 210695479 | U | | 6/2020 | |
| CN | 112810716 | A | * | 5/2021 | ............ B62D 57/02 |
| CN | 213427733 | U | | 6/2021 | |
| CN | 215836515 | U | | 2/2022 | |
| CN | 219182429 | U | | 6/2023 | |

* cited by examiner

*Primary Examiner* — Jeffrey R Larsen
(74) *Attorney, Agent, or Firm* — Birchwood IP (57) ABSTRACT

A rollable ball toy is provided, which includes a rollable ball shell, a driving component, and a support connector; the support connector can be deformed and fastened on two sides of a ball center of the rollable ball shell; the driving component is provided in the rollable ball shell. A driving device has only one driving output end, and the other end is provided with the shaft cavity configured to install manually operated components such as a control button and a charging dock, rendering the structure compact and reasonable, easy to operate, and improving waterproof and dustproof performance, while avoiding accidental contact and damage caused by collisions. The rollable ball has a quick detachable support connector. Most components are detachably connected and can be replaced with other parts, with strong interchangeability, long service life, and cost-effectiveness.

11 Claims, 6 Drawing Sheets

ROLLABLE BALL TOY

CROSS-REFERENCE TO RELATED APPLICATIONS

This application is a continuation of International Application No. PCT/CN2024/093006, filed on May 29, 2024, which claims priority to Chinese Patent Application No. 202420986972.1, filed on May 9, 2024, both of which are hereby incorporated by reference in their entireties.

TECHNICAL FIELD

The present disclosure relates to the field of pet toys technologies, and in particular, to a rollable ball toy.

BACKGROUND

With the increasing number of pet owners, in order to prevent pets from developing various diseases due to lack of exercise, a fast rolling toy has been designed for pets. This toy can stimulate the hunting nature of pets to chase and play with them. However, currently, most running or rolling toys have control buttons and charging holes that require frequent manual operation provided on a surface of a ball. There are problems such as accidentally touching the control button when the ball is rolled, inconvenient operation, and easy damage in collisions.

SUMMARY

The purpose of the present disclosure is to provide solutions to the above-mentioned problems, as described in the following description.

To achieve the above objectives, the present disclosure provides the following technical solutions.

The present disclosure provides a rollable ball toy, including a rollable ball shell, a driving component, and a support connector; the support connector is capable of being deformed and fastened on two sides of a ball center of the rollable ball shell; the driving component is provided in the rollable ball shell; one end of the support connector is fastened to an output end of the driving component and is fixed to the output end of the driving component in a circumferential direction; and the other end of the support connector is capable of being rotatably provided on a fixed shaft on one side of the rollable ball shell, the fixed shaft is provided with a shaft cavity.

In some embodiment of the present disclosure, one side of the support connector connected to the fixed shaft is provided with an opening, and the opening is communicated to the shaft cavity.

In some embodiment of the present disclosure, the driving component includes an electric control component, which is provided in the rollable ball shell, a control button and/or a charging dock of the electric control component is protruded from the shaft cavity.

In some embodiment of the present disclosure, the output end of the driving component is provided on one side of the rollable ball shell away from the shaft cavity, the output end of the driving component is connected to a rotating shaft, which is fixedly connected to one end of the support connector in a circumferential direction.

In some embodiment of the present disclosure, the support connector includes a right ring buckle and a left ring buckle, the right ring buckle and the left ring buckle are detachably connected, a hole is formed at a connection of the right ring buckle and the left ring buckle, the opening is provided on the right ring buckle.

In some embodiment of the present disclosure, the left ring buckle is provided with a left decorative cover, and the left decorative cover is detachably provided on the left ring buckle; the right ring buckle is provided with a soft rubber cover, and the soft rubber cover is detachably fastened on one end of the opening.

In some embodiment of the present disclosure, the rollable ball shell includes a right shell cover, a right shell, a left shell, and a left shell cover; the right shell cover is capable of being disassembled and installed on the right shell; the left shell cover is capable of being disassembled and installed on the left shell; the right shell and the left shell are capable of being clamped together; the driving component is provided in a space formed by the right shell and the left shell, and the fixed shaft is provided on the right shell cover.

In some embodiment of the present disclosure, the driving component further includes a gear assembly; the electronic control component further includes a motor and a battery; a charging power supply is capable of being inserted into the charging dock to charge the battery; the motor is electrically connected to the battery; the control button is capable of controlling the motor to rotate and driving the gear assembly to rotate; the gear assembly includes a first gear, a gear shaft, a dual gear, a second gear, and the rotating shaft; the gear assembly is provided in an installation groove inside the rollable ball shell; the motor drives the first gear to output power and transmits it to the second gear through the dual gear provided on the gear shaft; the rotating shaft is coaxially fixed on the first geared of the gear shaft.

In some embodiment of the present disclosure, the shaft cavity of the fixed shaft is provided with a button hole and a charging port; the charging dock and the control button are provided in the shaft cavity and extended out of an end face of the fixed shaft through the charging port and the button hole, respectively.

In some embodiment of the present disclosure, outer sides of the right shell and the left shell are provided with a soft rubber, and the support connector is connected to a hanging piece.

The beneficial effects of the present disclosure are as follows: 1. a driving device has only one driving output end, and the other end is provided with a shaft cavity configured to accommodate manually operated components such as a control button and a charging dock. This not only renders better use of space, renders the structure compact and reasonable, but also facilitates operation. At the same time, it improves waterproof and dustproof performance, and also avoids the button or the charging port from being provided on the ball, which may pause rolling or be damaged due to collision during rolling. 2. The rollable ball has a quick detachable support connector. When a rolling shaft is wrapped in hair, the support connector can be removed to achieve a quick removal. The hole on the support connector can be replaced with different hanging pieces, keeping the pet fresh at all times; 3. Most component are detachably connected, and when some parts are damaged, they can be replaced with other components, with strong interchangeability, long service life, and cost-effectiveness.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or prior art. It is obvious that the accompanying drawings described below are only some embodiments of the present disclosure. For those skilled in the art, other drawings can be obtained based on these drawings without creative labor.

Numeral reference: 10—rollable ball shell; 101—right shell cover; 1011—fixed shaft; 1012—button hole; 1013—charging port; 102—right shell; 103—left shell; 104—left shell cover; 20—support connector; 201—soft rubber cover; 202—right ring buckle; 2021—opening; 203—left ring buckle; 204—left decorative cover; 205—hole; 30—soft rubber; 40—electronic control component; 401—charging dock; 402—control button; 403—battery; 404—motor; 50—gear assembly; 501—first gear; 502—gear shaft; 503—dual gear; 504—second gear; 506—rotating shaft; 60—hanging piece.

DESCRIPTION OF EMBODIMENTS

In order to clarify purpose, technical solution, and advantages of the present disclosure, a detailed description of the technical solution of the present disclosure will be provided below. Obviously, the described embodiments are only a part of the embodiments of the present disclosure, not all embodiments. Based on the embodiments in the present disclosure, all other embodiments obtained by those skilled in the art without creative work are within the protection scope of the present disclosure.

Figure 1:
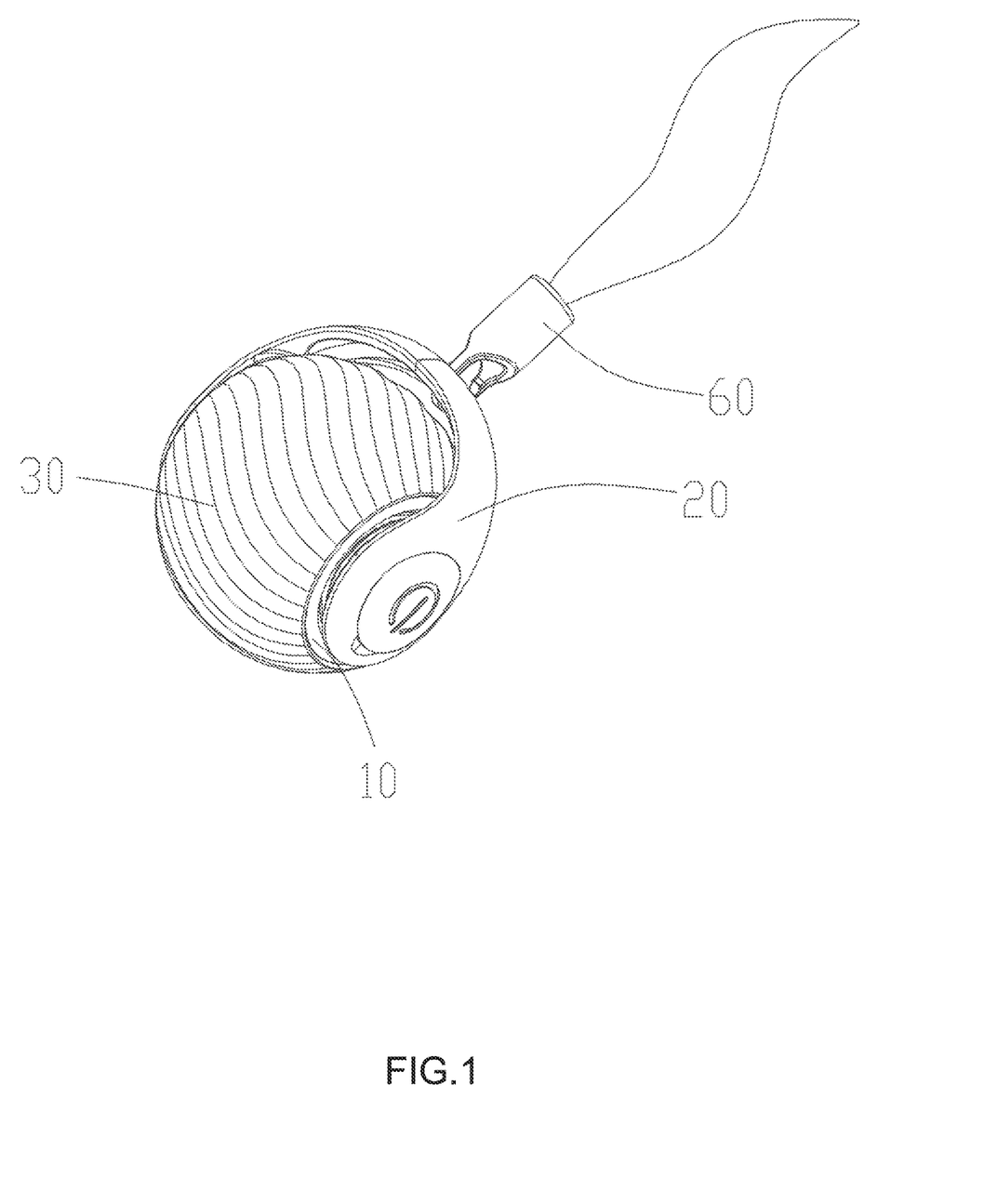
FIG. 1 is a schematic diagram of a three-dimensional structure of a rollable ball toy of the present disclosure.
Figure 2:
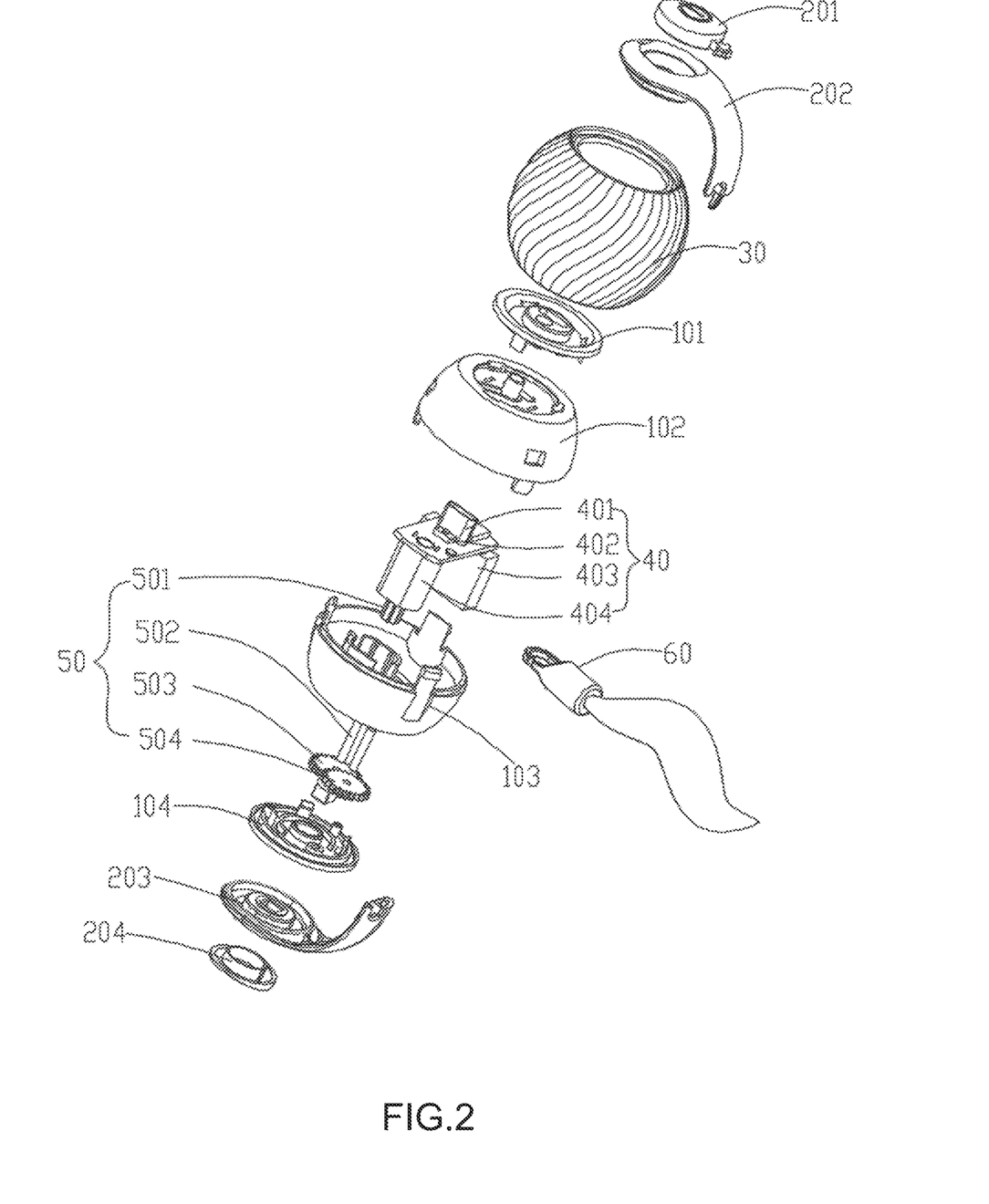
FIG. 2 is an exploded view of the rollable ball toy in an embodiment.
Figure 3:
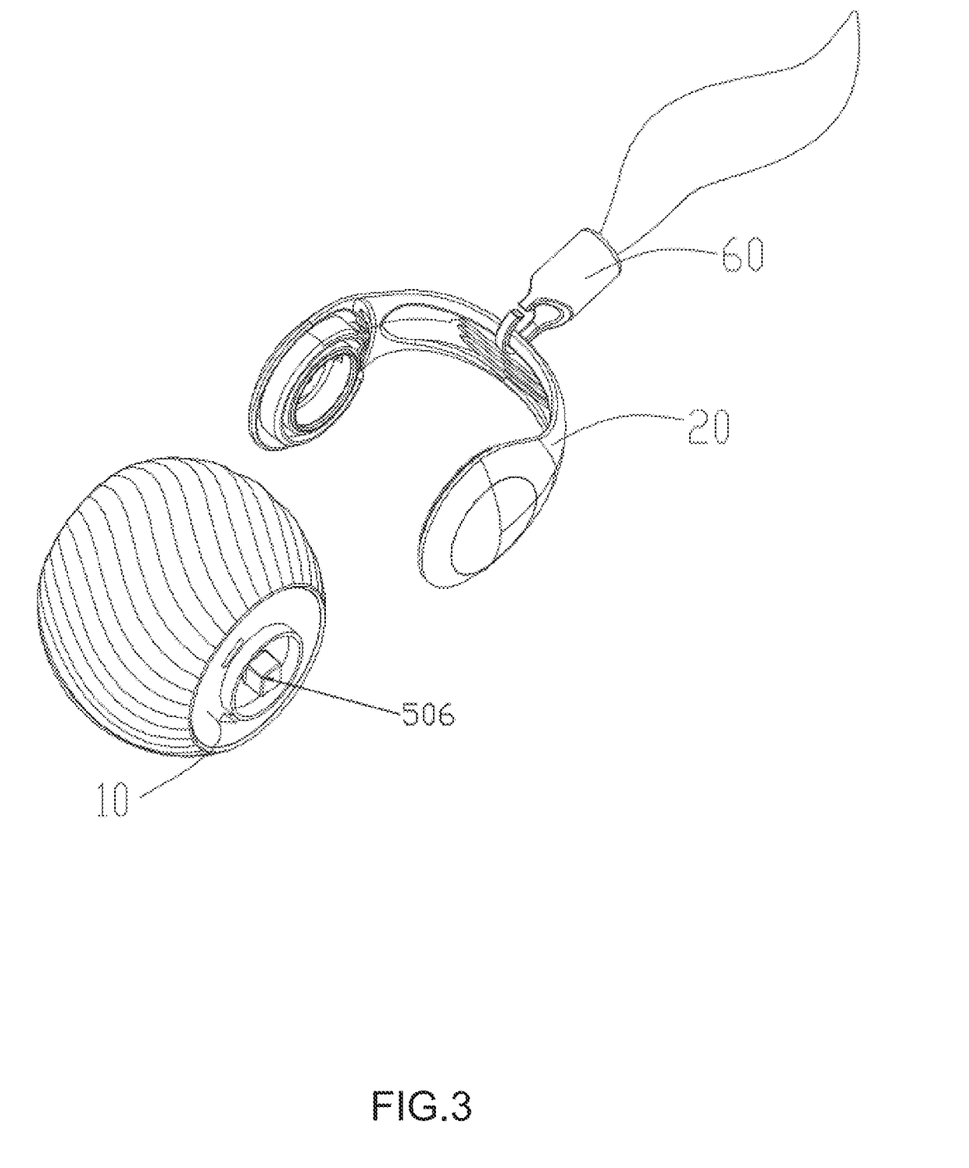
FIG. 3 is a separate diagram of a support connector and a rollable ball shell of the rollable ball in an embodiment.
Figure 4:
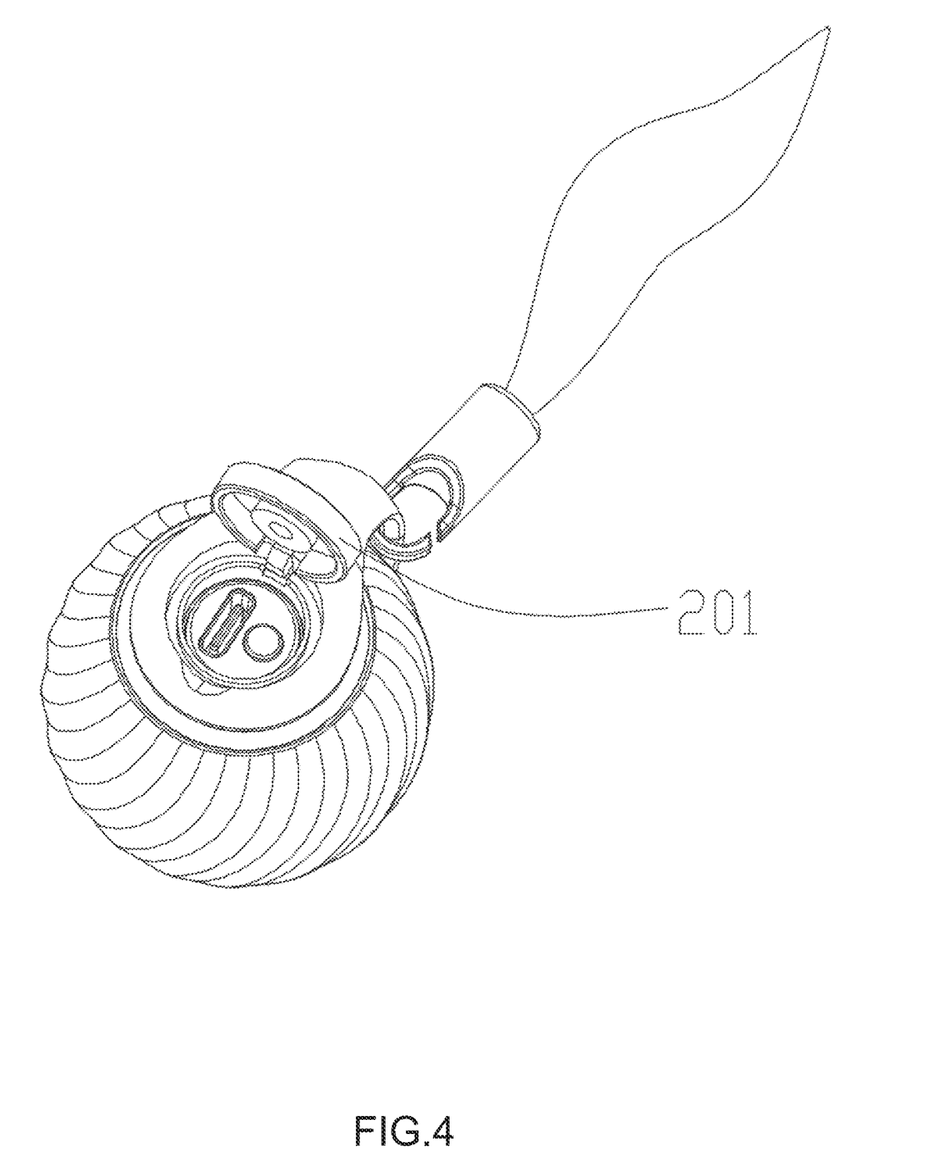
FIG. 4 is a state diagram of a soft rubber on a right shell being opened in an embodiment.
Figure 5:
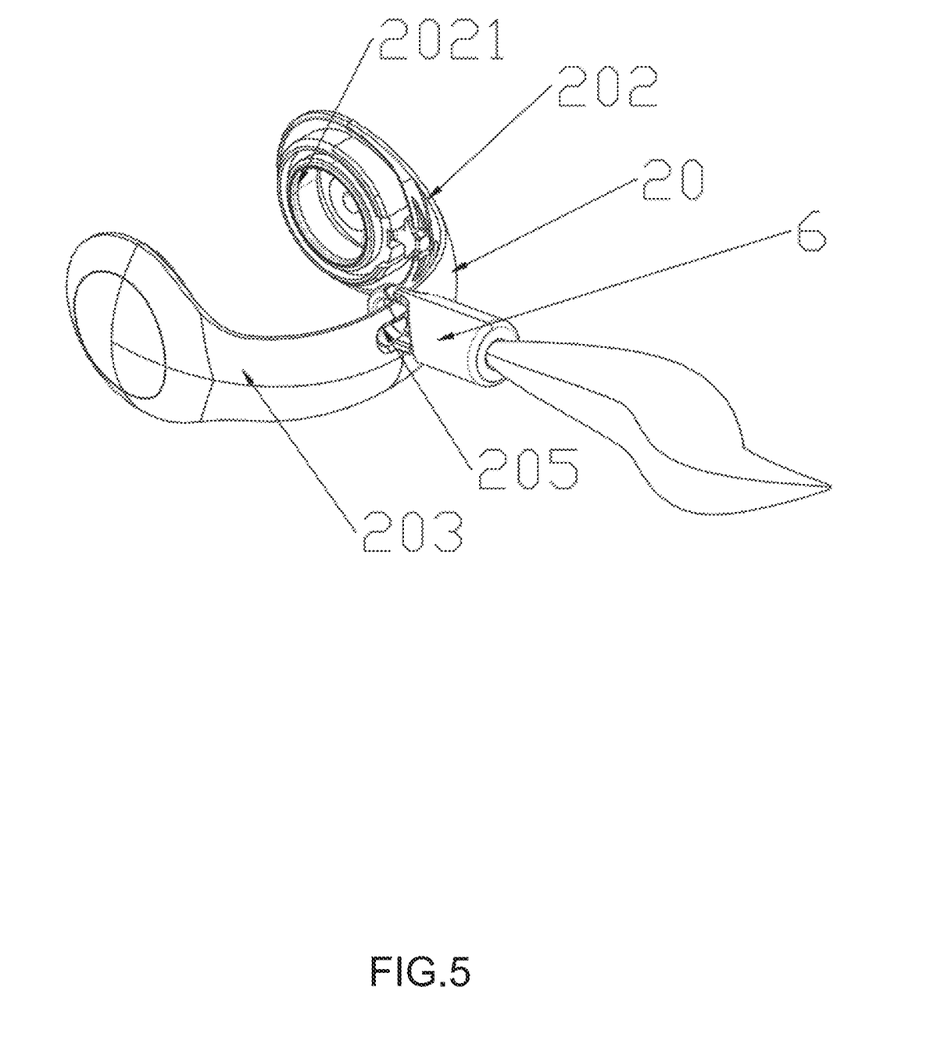
FIG. 5 is a schematic diagram of a connection structure between the support connector and a hanging piece in an embodiment.
Figure 6:
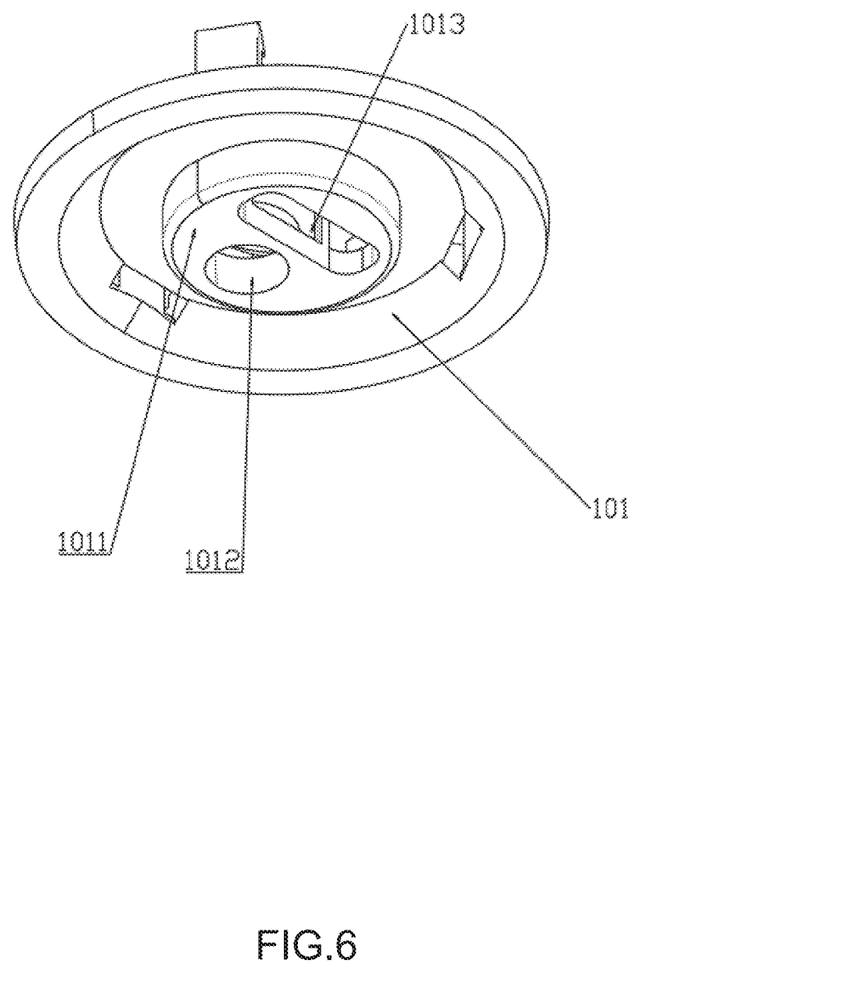
FIG. 6 is a schematic diagram of a connection structure of a right shell cover in an embodiment.

As shown in FIGS. 1-6, the present disclosure provides a rollable ball toy, which includes a rollable ball shell 10, a driving component, and a support connector 20. The support connector 20 can be deformed and fastened on two sides of a ball center of the rollable ball shell 10; one end of the support connector 20 is fastened to an output end of the driving component, and is fixed to the output end of the driving component in a circumferential direction. The other end of the support connector 20 can be rotatably provided on a fixed shaft 1011 on one side of the rollable ball shell 10, and the fixed shaft 1011 is provided with a shaft cavity. When the rollable ball shell 10 is started, the rotating shaft 506 is rotated, which in turn drives the support connector 20 to rotate. At this time, the support connector 20 is always kept on one side of the ball under an influence of gravity, thereby providing support for the rollable ball shell 10, so that it be quickly rolled forward. In an implementation mode, the support connector 20 of the present application can be a semi-circular arc or a circular ring. The shaft cavity is configured to accommodate installation components as needed, such as a charging dock 401, a control button 402, etc., to meet needs of different people.

In this embodiment, an opening 2021 is provided on one side of the support connector 20 connected to the fixed shaft 1011, and the opening 2021 is communicated to the shaft cavity, so that the charging dock 401 provided in the shaft cavity can be charged without disassembling the support connector 20.

In this embodiment, the driving component includes an electronic control component 40, which is provided in the rollable ball shell 10. A control button 402 and/or a charging dock 401 of the electronic control component 40 is protruded from the shaft cavity. Providing with the control button 402 and the charging dock 401 in the shaft cavity can not only prevent damage caused by ball collision, but also avoid accidentally touching the control button 402 during rolling.

In this embodiment, the output end of the driving component is provided on one side of the rollable ball shell 10 away from the shaft cavity. The output end of the driving component is connected to the rotating shaft 506, which is fixedly connected to one end of the support connector 20 in a coaxial direction.

In this embodiment, the support connector 20 includes a right ring buckle 202 and a left ring buckle 203, which are detachably connected and form a hole 205 at a connection of the right ring buckle 202 and the left ring buckle 203. The opening 2021 is provided on the right ring buckle 202. The support connector 20 is driven into the left ring buckle 203 and the right ring buckle 202 to facilitate quick disassembly and assembly of the support connector 20. A hole 205 is provided at a connection between the left ring buckle 203 and the right ring buckle 202, which facilitates an installation of various hanging pieces 60 so as to increase the playability of the rollable ball.

In this embodiment, a left decorative cover 204 is provided on the left ring buckle 203, and the left decorative cover 204 is detachably provided on the left ring buckle 203. A soft rubber cover 201 is provided on the right ring buckle 202, and the soft rubber cover 201 is detachably fastened to one end of the opening 2021. Providing with the soft rubber cover 201 can only control the control button 402 by pressing the soft rubber cover 201, and it can also play a role of waterproof and dustproof.

In this embodiment, the rollable ball shell 10 includes a right shell cover 101, a right shell 102, a left shell 103, and a left shell cover 104. The right shell cover 101 can be disassembled and installed on the right shell 102. The left shell cover 104 can be disassembled and installed on the left shell 103. The right shell 102 and the left shell 103 are clamped together. The driving component is provided in a space formed by the right shell 102 and the left shell 103, and the fixed shaft 1011 is provided on the right shell cover 101.

In this embodiment, the driving component further includes a gear assembly 50. The electronic control component 40 further includes a motor 404 and a battery 403. A charging power supply can be inserted into the charging dock 401 so as to charge the battery 403, and the motor 404 is electrically connected to the battery 403. The control button 402 can control the motor 404 to be rotated and drive the gear assembly 50 to rotate. The gear assembly 50 includes a first gear 501, a gear shaft 502, a dual gear 503, a second gear 504, and the rotating shaft 506. The gear assembly 50 is provided in an installation groove inside the rollable ball shell 10. The motor 404 drives the first gear 501 to output power and transmits it to the second gear 504 through the dual gear 503 provided on the gear shaft 502. The rotating shaft 506 is coaxially fixed on the first gear 501. In an implementation mode, an installation groove is provided on one side of the output end of the driving component, the installation groove is a gearbox, and this gearbox is composed of a plurality of stages of stacked gears to reduce speed and increase torque. The left shell cover 104 is configured to fix this gearbox on one side of the rollable ball shell 10.

In this embodiment, the shaft cavity of the fixed shaft 1011 is provided with a button hole 1012 and a charging port 1013; the charging dock 401 and the control button 402 are provided inside the shaft cavity and extended out of an end face of the fixed shaft 1011 through the charging port 1013 and the button hole 1012, respectively.

In an implementation mode, outer sides of the right shell 102 and the left shell 103 are provided with a soft rubber 30 on an outer of the ball, and the support connector 20 is connected to a hanging piece 60. The soft rubber 30 can better reduce noise and increase adhesion to the ground during rolling. Left and right sides of the soft rubber 30 are pressed and fixed by the right shell cover 101 and the left shell cover 104.

The beneficial effects are as follows: 1. a driving device of the present disclosure has only one driving output end, and the other end is provided with a shaft cavity configured to accommodate manually operated components such as the control button 402 and the charging dock 401. This not only renders better use of space, renders the structure compact and reasonable, but also facilitates operation. At the same time, it also improves waterproof and dustproof performance, and avoids the button or the charging port 1013 from being provided on the ball, which may pause rolling or be damaged due to collision during rolling. 2. The rollable ball has a quick detachable support connector 20. When a rolling shaft is wrapped in hair, the support connector 20 can be removed to achieve a quick removal. The hole 205 on the support connector 20 can be replaced with different hanging pieces 60, keeping the pet fresh at all times. 3. Most components are detachably connected, and when some parts are damaged, they can be replaced with other components, with strong interchangeability, long service life, and cost-effectiveness.

The above is only a specific implementation of the present disclosure, but the protection scope of the present disclosure is not limited to this. Any skilled person familiar with the technical field can easily think of changes or replacements within the technical scope disclosed in the present disclosure, which should be included in the protection scope of the present disclosure. Therefore, the protection scope of the present disclosure should be based on the protection scope of the claims.

What is claimed is:

1. A rollable ball toy, comprising a rollable ball shell, a driving component, and a support connector;
   the support connector is capable of being deformed and fastened on two sides of a ball center of the rollable ball shell;
   the driving component is provided in the rollable ball shell;
   one end of the support connector is fastened to an output end of the driving component; the other end of the support connector is capable of being rotatably provided on a fixed shaft on one side of the rollable ball shell,
   the fixed shaft is provided with a shaft cavity;
   wherein the support connector comprises a right ring buckle and a left ring buckle,
   the right ring buckle and the left ring buckle are detachably connected.

2. The rollable ball toy according to claim 1, wherein one side of the support connector connected to the fixed shaft is provided with an opening, and the opening is communicated to the shaft cavity.

3. The rollable ball toy according to claim 2, wherein
   a hole is formed at a connection of the right ring buckle and the left ring buckle,
   the opening is provided on the right ring buckle.

4. The rollable ball toy according to claim 2, wherein the left ring buckle is provided with a left decorative cover, and the left decorative cover is detachably provided on the left ring buckle;
   the right ring buckle is provided with a soft rubber cover, and the soft rubber cover is detachably fastened on one end of the opening.

5. The rollable ball toy according to claim 1, wherein the driving component comprises an electric control component, which is provided in the rollable ball shell,
   a control button and/or a charging dock of the electric control component is protruded from the shaft cavity.

6. The rollable ball toy according to claim 5, wherein the output end of the driving component is provided on one side of the rollable ball shell away from the shaft cavity,
   the output end of the driving component is connected to a rotating shaft, which is fixedly connected to one end of the support connector in a circumferential direction.

7. The rollable ball toy according to claim 6, wherein the rollable ball shell comprises a right shell cover, a right shell, a left shell, and a left shell cover;
   the right shell cover is capable of being disassembled and installed on the right shell;
   the left shell cover is capable of being disassembled and installed on the left shell;
   the right shell and the left shell are capable of being clamped together;
   the driving component is provided in a space formed by the right shell and the left shell, and the fixed shaft is provided on the right shell cover.

8. The rollable ball toy according to claim 7, wherein the shaft cavity of the fixed shaft is provided with a button hole and a charging port;
   the charging dock and the control button are provided in the shaft cavity and extended out of an end face of the fixed shaft through the charging port and the button hole, respectively.

9. The rollable ball toy according to claim 7, wherein outer sides of the right shell and the left shell are provided with a soft rubber, and the support connector is connected to a hanging piece.

10. The rollable ball toy according to claim 6, wherein the driving component further comprises a gear assembly;
    the electric control component further comprises a motor and a battery;
    a charging power supply is capable of being inserted into the charging dock to charge the battery;
    the motor is electrically connected to the battery;
    the control button is capable of controlling the motor to rotate and driving the gear assembly to rotate;
    the gear assembly comprises a first gear, a gear shaft, a dual gear, a second gear, and the rotating shaft;
    the gear assembly is provided in an installation groove inside the rollable ball shell;
    the motor drives the first gear to output power and transmits it to the second gear through the dual gear provided on the gear shaft;
    the rotating shaft is coaxially fixed on the first gear.

11. The rollable ball toy according to claim 1, wherein one end of the support connector is fixed to the output end of the driving component in a circumferential direction.

* * * * *